US012058523B2

(12) United States Patent
Shaw

(10) Patent No.: US 12,058,523 B2
(45) Date of Patent: *Aug. 6, 2024

(54) WIRELESS NETWORK THAT DISCOVERS HOTSPOTS FOR CYBERATTACKS BASED ON SOCIAL MEDIA DATA

(71) Applicant: T-Mobile USA, Inc., Bellevue, WA (US)

(72) Inventor: Venson Shaw, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,759

(22) Filed: Aug. 16, 2022

(65) Prior Publication Data
US 2022/0394481 A1 Dec. 8, 2022

Related U.S. Application Data

(63) Continuation of application No. 17/007,782, filed on Aug. 31, 2020, now Pat. No. 11,457,361.

(51) Int. Cl.
*H04L 51/52* (2022.01)
*H04L 9/40* (2022.01)
*H04L 67/306* (2022.01)
*H04W 12/122* (2021.01)
*H04W 84/04* (2009.01)

(52) U.S. Cl.
CPC .......... *H04W 12/122* (2021.01); *H04L 51/52* (2022.05); *H04L 63/145* (2013.01); *H04L 63/1491* (2013.01); *H04L 67/306* (2013.01); *H04W 84/042* (2013.01)

(58) Field of Classification Search
CPC .............. H04W 84/042; H04W 12/122; H04L 67/306; H04L 63/1491; H04L 63/145; H04L 51/52
USPC ......................................................... 726/23
See application file for complete search history.

(56) References Cited

U.S. PATENT DOCUMENTS

| | | | |
|---|---|---|---|
| 8,191,149 B2 | 5/2012 | Yun et al. | |
| 8,789,179 B2* | 7/2014 | Sabin | G06F 21/554 713/193 |
| 9,699,209 B2 | 7/2017 | Ng et al. | |
| 9,769,201 B2 | 9/2017 | Doron et al. | |
| 9,930,058 B2 | 3/2018 | Carpenter et al. | |
| 10,348,747 B2 | 7/2019 | Yamada et al. | |
| 11,146,586 B2 | 10/2021 | Bulut et al. | |
| 11,564,266 B1* | 1/2023 | Kahn | H04W 12/69 |
| 2008/0115221 A1 | 5/2008 | Yun et al. | |
| 2015/0172311 A1 | 6/2015 | Freedman et al. | |
| 2016/0050225 A1 | 2/2016 | Carpenter et al. | |

(Continued)

*Primary Examiner* — Josnel Jeudy
(74) *Attorney, Agent, or Firm* — Perkins Coie LLP

(57) ABSTRACT

A method to prevent or reduce cyberattacks can include analyzing information of users of a 5G network. The information can include user profile data and social media data. The method can further include ranking the users according to a network security ranking based on a social media ranking, to identify target users as potential hotspots for cyberattacks. The 5G network dynamically assigns computing resources based on the network security ranking to monitor computing device(s) associated with the target users and receives an indication of a malicious software of the computing device(s) as detected by the computing resources.

20 Claims, 5 Drawing Sheets

(56) References Cited

U.S. PATENT DOCUMENTS

| | | |
|---|---|---|
| 2017/0170988 A1* | 6/2017 | Mazarick ................ H04L 47/78 |
| 2017/0230409 A1 | 8/2017 | Ahmed et al. |
| 2018/0063171 A1 | 3/2018 | Yamada et al. |
| 2018/0103052 A1 | 4/2018 | Choudhury et al. |
| 2019/0036958 A1 | 1/2019 | Shi |
| 2019/0058721 A1* | 2/2019 | Cullison ............. H04L 63/1416 |
| 2019/0141061 A1 | 5/2019 | Krishtal et al. |
| 2020/0153851 A1* | 5/2020 | Bulut .................. H04L 63/1433 |
| 2020/0221442 A1* | 7/2020 | Shreevastav .......... H04W 72/51 |
| 2021/0150564 A1* | 5/2021 | Robinson ............... G06Q 30/02 |
| 2022/0070673 A1 | 3/2022 | Shaw |
| 2023/0273935 A1* | 8/2023 | Sopic ................ G06F 16/24578 |
| | | 707/727 |

* cited by examiner

WIRELESS NETWORK THAT DISCOVERS HOTSPOTS FOR CYBERATTACKS BASED ON SOCIAL MEDIA DATA

CROSS-REFERENCE TO RELATED APPLICATION

This application is a continuation of U.S. patent application Ser. No. 17/007,782, filed Aug. 31, 2020, entitled WIRELESS NETWORK THAT DISCOVERS HOTSPOTS FOR CYBERATTACKS BASED ON SOCIAL MEDIA DATA, which is hereby incorporated by reference in its entirety.

BACKGROUND

Social media has changed the way we connect and share our experiences. Thanks to the various social media platforms, people from around the world can connect and exchange content with each other. 5G technologies enable increased content consumption compared to prior telecommunications technologies. For example, 3G enabled greater consumption of pictures and texts and 4G gave rise to video content and social media platforms such as Instagram®, YouTube®, and Snapchat®. Instagram® launched so people could share pictures but, with faster network speeds, the platform moved on to video and allowed its users to upload 30-second videos. With an increase in video consumption, Instagram® has also launched IGTV®, where users can upload videos that are greater than one minute.

With 5G networks, immersive technology can reach a new level because 5G enables mass rollout of augmented reality (AR) and virtual reality (VR) technologies. Once VR becomes ubiquitous, it will completely change the dynamics of social media. Facebook® has already launched apps and platforms based on AR/VR such as Facebook® spaces, VRChat, and Oculus® Homes. With VRChat, users can play, chat and hang-out with their friends using avatars and spatialized 3D audio. Also, users can play multiplayer games and visit virtual space stations to watch YouTube® videos together.

The deployment of social media on 5G networks will create a plethora of possibilities for digital marketers. For example, brands can increase engagement by launching AR stores, which will allow customers to review products, try and buy them. In another example, AR videos allow brands to demonstrate to customers how to use a product or show how a customer can experience a service. Airlines, for example, can use AR videos to show how flying with them would feel like. However, the increased connectivity and sharing of content will give rise to more cyberattacks from malware or malicious activities that can readily spread on 5G networks through social media platforms.

BRIEF DESCRIPTION OF THE DRAWINGS

Embodiments of the present technology will be described and explained through the use of the accompanying drawings.

Figure 1:
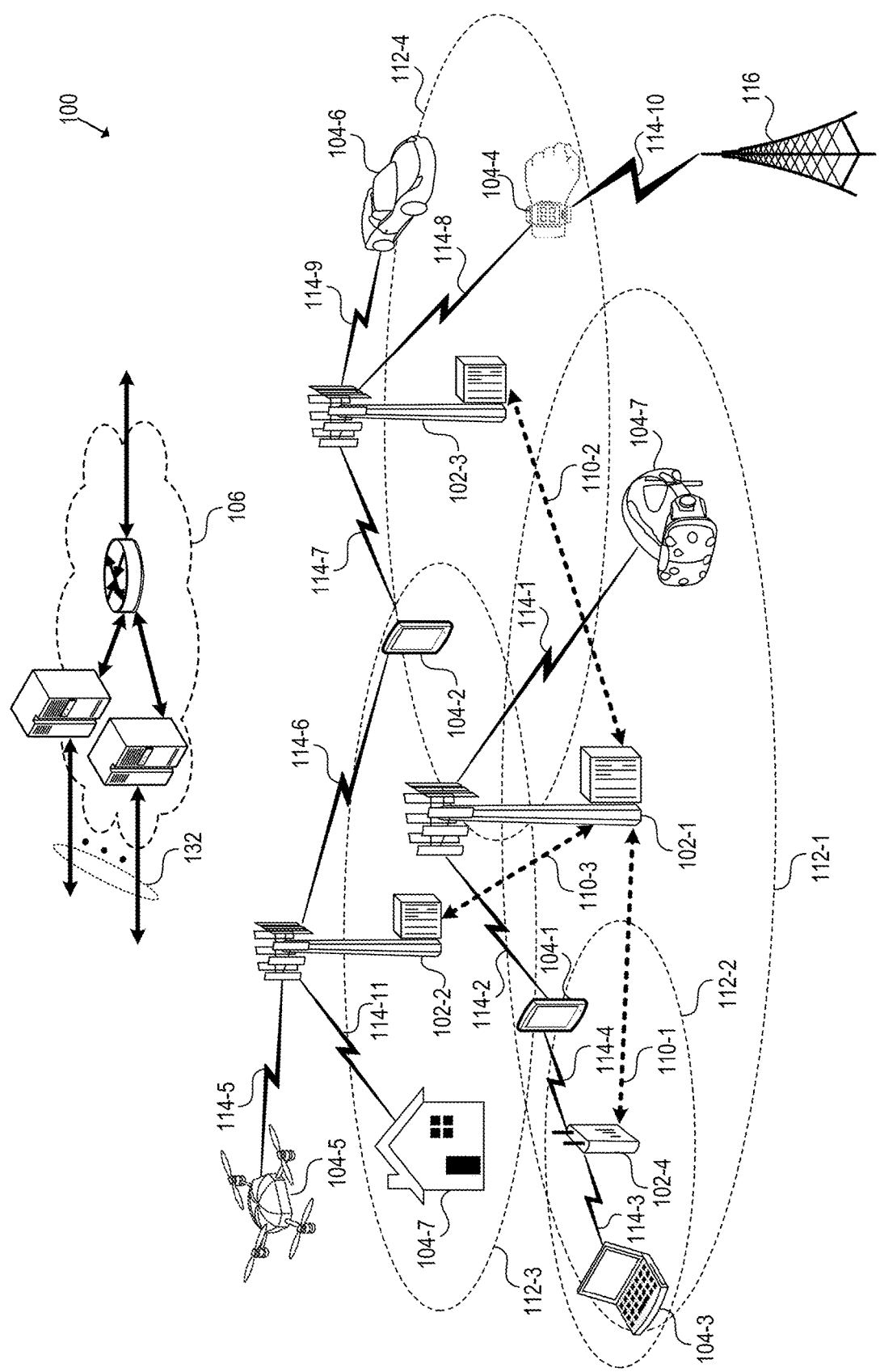
FIG. 1 is a block diagram that illustrates a wireless telecommunications system.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Each time a wireless device enters and leaves a 5G network coverage area, the wireless device is exposed to a wide range of cyberattacks. Examples of types of cyberattacks include a man-in-the-middle attack (MITM), denial-of-service (DoS) attack, SIM-swap attack, and ransomware attack. These forms of cyberattacks allow attackers, malicious software, or applications to obtain access to the 5G network.

The disclosed technology addresses the harm of cyberattacks. To identify users who pose a higher risk to a 5G network, a disclosed system uses information stored in the unified data management (UDM) database of the 5G network to analyze user profiles of users having social media accounts. The system ranks the users having the social media accounts according to a network security ranking to identify users who are associated with hotspots for cyberattacks. In one example, a ranking is proportional to the number of connections that a user has on a social media platform or a specific connection to a known or suspected malicious entity with a social media account on the social media platform.

A "hotspot" for a cyberattack relates to a user with a social media account who has a status exceeding a threshold, where the status and the threshold can be determined by the type of social media platform. For example, for a Facebook® account, the status and threshold can relate to a number of friends associated with the account. In another example, for a Twitter® account, the status and threshold can relate to the number of followers associated with a user.

The 5G network can dynamically assign/allocate computing resources (e.g., logical or virtual firewalls, encryption modules) based on the ranking to monitor computing devices associated with the users identified as hotspots for the cyberattacks. The system can identify malicious software or activities in the computing devices using the dynamically assigned computing resources. For example, the computing resources can include a device or software application that monitors a network or systems for malicious activity or policy violations associated with users. Any malicious activity or violation can be reported either to an administrator or collected centrally using a security information and event management (SIEM) system.

The system can also identify certain user connections (e.g., friends, family) associated with hotspots, rank the connections according to a network security ranking, and assign computing resources to the connections based on the ranking to similarly monitor and detect potential harm to the 5G network or social media platform. The system can respond to potential harm by blocking or quarantining a connection or social media traffic associated with a potential or actual cyberattack.

The described technology can thus safeguard wireless network infrastructures and social media platforms based on profile data and social media data. Additional techniques are described in the assignee's related applications including US Patent application Ser. No. 16/945,592, filed Jul. 31, 2020, titled "Cached Entity Profiles at Network Access Nodes to Re-Authenticate Network Entities," U.S. patent application Ser. No. 16/849,158, filed Apr. 15, 2020, titled "On-Demand Security Layer for a 5G Wireless Network," and US patent Application Ser. No. 16/921,765, filed Jul. 6, 2020, titled "Security System for Managing 5G Network Traffic," each of which are incorporated by reference in their entireties for all purposes.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred as a cell site, a base transceiver station, or a radio base station. The system 100 can include any combination of NANs including an access point, a radio transceiver, a gNodeB (gNB), NodeB, eNodeB (eNB), Home NodeB, a Home eNodeB, or the like. In addition to being a WWAN base station, a NAN can be a WLAN access point, such as an IEEE 802.11 access point.

The NANs of a network formed by the system 100 also includes wireless devices 104-1 through 104-8 (referred to individually as "wireless device 104" or collectively as "wireless devices 104") and a core network 106. The wireless devices 104-1 through 104-8 are capable of communication using various connectivity standards. For example, a 5G communication channel can use millimeter waver (mmW) access frequencies of 28 GHz or more. In some implementations, the wireless device 104 can operatively couple to a base station 102 over an LTE/LTE-A communication channel, which is referred to as a 4G communication channel.

The core network 106 can provide, manage, or control security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC)).

In some examples, the system 100 can include a 5G network and/or an LTE/LTE-A network. In an LTE/LTE-A network, the term eNB is used to describe the base stations 102 and, in 5G or new radio (NR) networks, the term gNBs is used to describe the base stations 102 that include mmW communications. The system 100 can form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow unrestricted access by wireless devices with service subscriptions with the network provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively small geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions may also be called forward link transmissions while the uplink transmissions may also be called reverse link transmissions. Each communication link 114 includes one or more carriers, where each carrier can be a signal composed of multiple sub-carriers (e.g., waveform signals of different frequencies) modulated according to the various radio technologies described above. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some embodiments, the communication links 114 include LTE and/or mmW communication links.

In some embodiments of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that may take advantage of multi-path environments to transmit multiple spatial layers carrying the same or different coded data.

In some embodiments, the wireless devices 104 are capable of communicating signals via the LTE network and an mmW system (e.g., as part of a 5G/NR system). Accordingly, the wireless device 104 can communicate with the base station 102 over an LTE link and/or with a transmission point (TP) or base station (BS) over an mmW link. In another example, at least one of the base stations 102 communicates signals via the LTE network and the mmW system over one or more communication links 114. As such, a base station 116 may be referred to as an LTE+mmW eNB or gNB or as an LTE+mmW TP/BS/mmW-BS.

Figure 2:
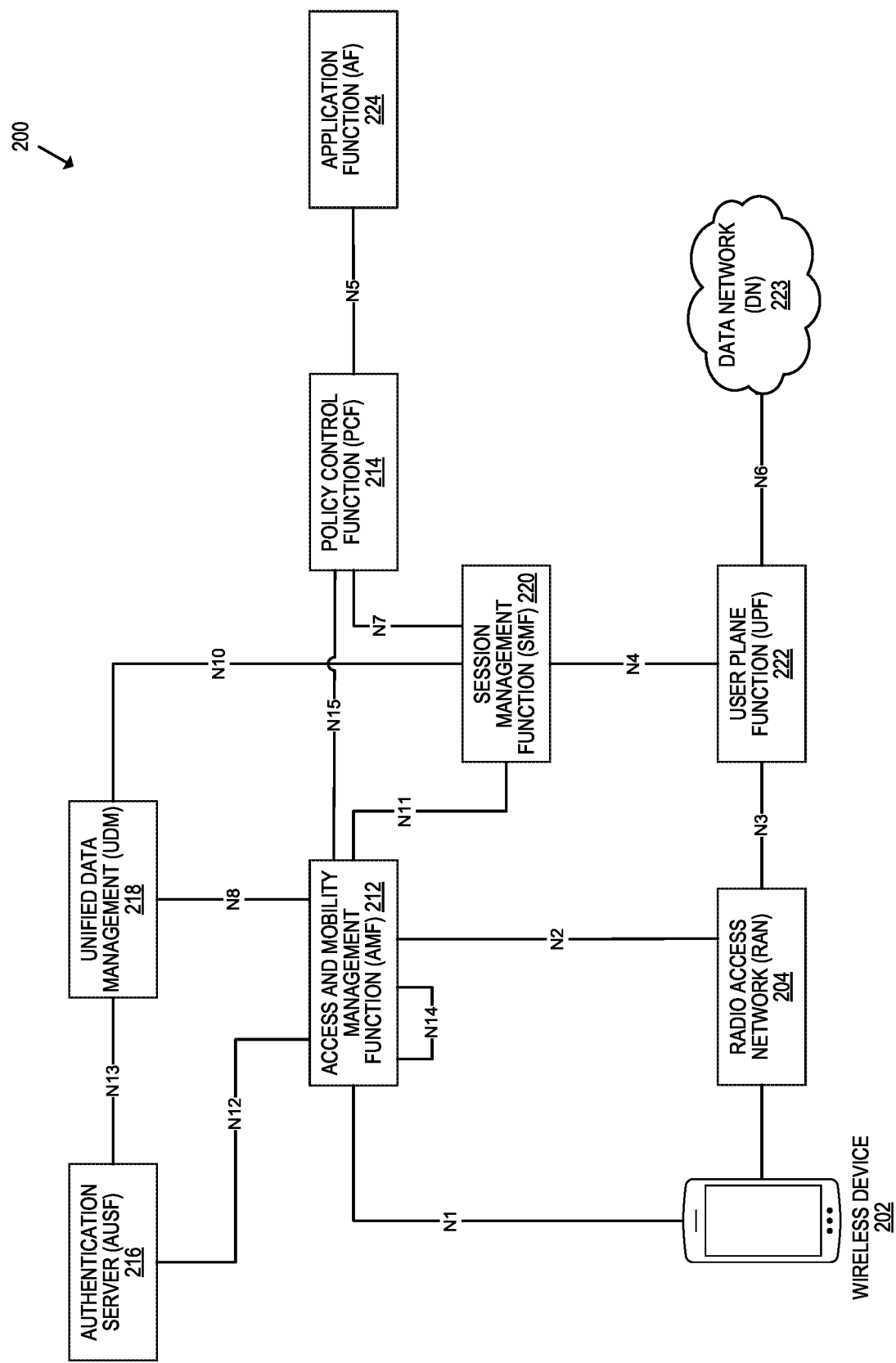
FIG. 2 is a block diagram that illustrates an architecture of network functions of a 5G network.

FIG. 2 is a block diagram that illustrates an architecture of network functions of a 5G network that can implement aspects of the present technology. A wireless device 202 can access the 5G network via a RAN 204, through a NAN such as a small cell. The architecture of the network functions 200 includes an authentication server function (AUSF) 216, a unified data management (UDM) 218, an access and mobility management function (AMF) 212, a policy control function (PCF) 214, a session management function (SMF) 220, and a user plane function (UPF) 222. The PCF 214 can connect with one or more application functions (AFs) 224. The UPF 222 can connect with one or more data networks (DNs) 223. The interfaces N1 through N15 define the communications and/or protocols between each function or component, as described in relevant standards. The UPF 222 is part of the user plane and the AMF 212, SMF 220, PCF 214, AUSF 216, and UDM 218 are part of the control plane. The UPFs can be deployed separately from control plane functions and the network functions of the control plane are modularized such that they can be scaled independently.

A UDM introduces the concept of user data convergence (UDC) that separates the user data repository (UDR) for storing and managing subscriber information from the frontend that processes the subscriber information. The UDM can employ UDC under 3GPP TS 22.101, which supports a layered architecture that separates user data from application logic in 3GPP systems. The UDM 218 is associated with a database (not shown) that can contain profile data for subscribers and/or other data that can be used to authenticate network entities (e.g., subscribers, wireless devices). Given the large number of wireless devices (e.g., IoT devices) that can connect to the 5G network, the UDM 220 contains a voluminous amounts of profile data that is accessed to authenticate network entities.

For example, each time that a wireless device seeks to connect to a 5G network, a UDM receives an indication of a connection request received by a NAN, and authorizes the connection request by authenticating the wireless device or subscriber based on profile data stored at the UDM. The UDM can then communicate an indication of the authorization to the NAN so that the wireless device can access the 5G network through the NAN. This leads to high latency of control signaling, along with voluminous queries across the network from various NANs for the UDM.

Discovery of Hotspots for Cyberattacks Based on Social Media Data

The disclosed technology relates to identifying users of a wireless network (e.g., 5G network) that pose a potential or actual cyberattack to the network or a social media platform. The users that pose a higher risk to the wireless network or social media platform are identified based on information including profile data stored at the UDM database of the wireless network and associated social media data. The system ranks the users according to the social media data to identify those who are associated with hotspots for cyberattacks. The system can then dynamically assign/allocate computing resources (e.g., physical, logical) based on the ranking to monitor computing devices associated with the hotspots for cyberattacks. The computing resources can, for example, monitor and identify malicious software and other malicious activity, report a potential or actual threat of a cyberattack, and then the system can act upon that information to prevent or reduce the harm of potential or actual cyberattacks. The system can also identify other social media users based on connections (e.g., friends, family) with the hotspots, rank those connected users, reallocate the computing resources to computed devices of the connected users based on the ranking, and thwart potential cyberattacks from those devices based on any detected threats of potential or actual cyberattacks.

Figure 3:
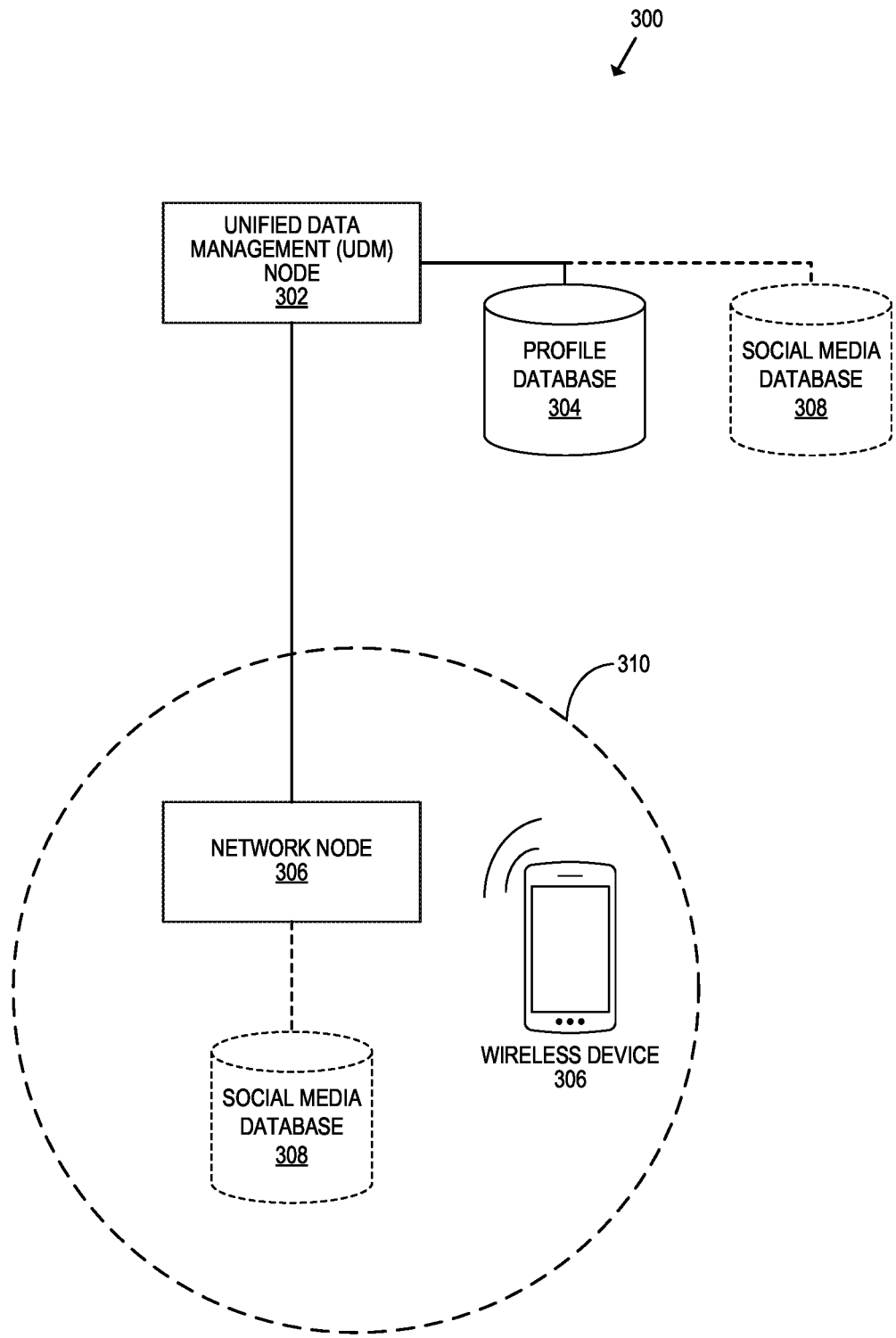
FIG. 3 is a block diagram that illustrates a system that includes a unified data management (UDM) node coupled to a network access node.

FIG. 3 is a block diagram that illustrates a system 300 including a UDM 302 coupled to a network node 306. The network node 306 can be a NAN with a wireless range that spans an area 310 and includes a wireless device 312. The network node 306 can include any type of network node that is coupled to the UDM 302, which is commonly used to authenticate a user for access to the wireless network.

The UDM 302 can access or include a profile database 304 that stores profile data such as subscriber profile data or device profile data. In some instances, data other than typical profile data is stored at the profile database 304. For example, the profile database 304 can store data related to social media accounts of users, and other personal account such as online affinity forums, political/religious online communities, online dating networks/applications, etc. Examples of the social media data include a type of social media account associated with a registered user (also referred to as a user) and data that indicates the connectedness of the user with other users of a social media platform.

For example, the system or a social media platform can identify a user as a celebrity, politician, social leader or other "influencer" who can influence many users to, for example, buy a product, promote an idea, change behavior, etc. An influencer is ripe for targeting by wrongdoers because of the numerous connections that the influencer has with other users. An influencer or degree of influence could be inferred from the number of users in the particular user's social network. Accordingly, the system or social media platform can identify the number, amount, or quantity of social media connections per user, including the number of users in a particular user's social network. This type of social media data could be stored at the UDM database along with profile data.

In some instances, a social media platform provides verified accounts for users, which could be ripe for wrongdoing due to connectedness with other users. An account can be verified if it is determined to be an account of public interest. Typically, this includes accounts maintained by users in music, acting, fashion, government, politics, religion, journalism, media, sports, business, and other key interest areas. In other instances, an account of public interest can be identified through third-party databases such as an associated Internet Movie Database (IMDb) or can be inferred because, for example, a politician/candidate could have a profile on a social media platform that is linked to a verified/official profile on a website of a political party. As such, the system can flag UDM profile entries that are cross-referenced with third-party databases or other sources that are indicative of the influence or related public interest of a user.

In one example, the UDM 302 can access a social media database 308 that stores the social media data. The social media database 308 can be located local to the UDM 302 or is accessible remotely over a network. In another implementation, the network node 306 can access a social media database 308 and obtain profile data from the UDM 302 to discover hotspots and cause the system to respond accordingly. For example, the network node 306 can obtain profile data associated with the wireless device 312 from the UDM 302 and obtain associated social media data from the social media database 308 when a user is seeking to connect with the wireless network. As such, the network node 306 can use the profile data to authenticate a user and use the social media data to determine whether that user is associated with a hotspot for a cyberattack. The system can deploy resources in accordance with the result of the analysis to thwart cyberattacks.

As such, the system 300 can store profile data along with social media data of one or more social media platforms to determine whether a user is associated with a hotspot for cyberattacks. The system 300 can discover potential hotspots based on the connections of users across different social media platforms as well. For example, a user of a first social media platform could be identified by the system 300 based on social media data as a hotspot and discover that the hotspot is associated with other users of another social media platform, thereby discovering potential hotspots across social media platforms.

Figure 4:
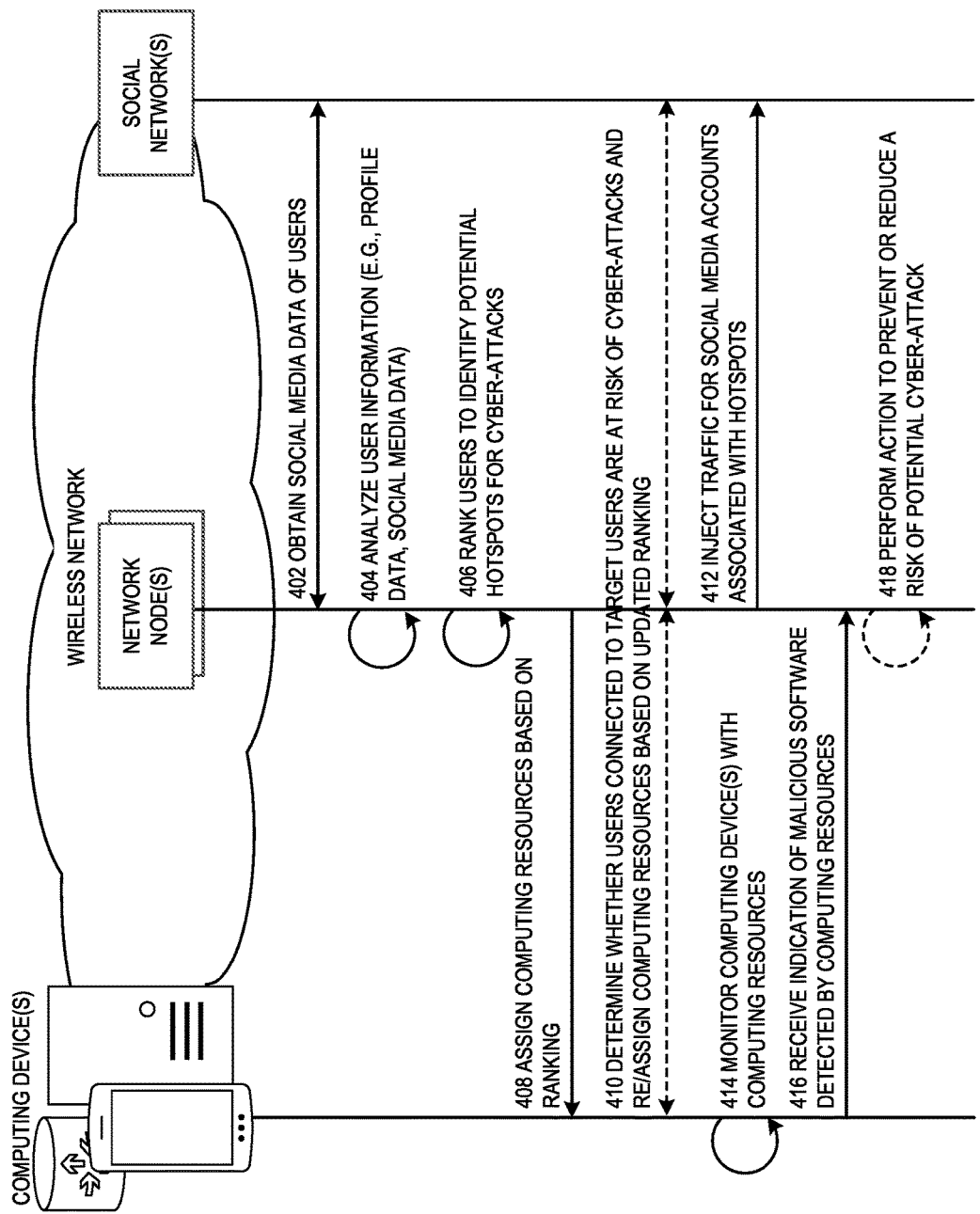
FIG. 4 is a flowchart that illustrates a method to prevent or reduce cyberattacks to a wireless network or a social media platform.

FIG. 4 is a flowchart that illustrates a method 400 to prevent or reduce cyberattacks to a wireless network or a social media platform. The method is performed by one or more network nodes that comprise a system of the wireless network (e.g., system 300). In one example, a UDM database stores social media data along with profile data to identify potential hotspots for cyberattacks based in part on the social media data.

At 402, the system obtains the social media data of social media platforms over a wireless network. Examples of popular social media platforms include Facebook®, Twitter®, LinkedIn®, Instagram®, TikTok®, Snapchat®, Pinterest®, and Reddit®. A social media platform can logically connect social media accounts of users to form social media networks that connect users. A social platform usually allows a user to grant different access rights to other users. For example, a user of Facebook® can "friend" another user to share certain content. Thus, a user can establish his or her own social network of connections on Facebook®.

Facebook® currently has the most active users compared to any other social media platforms. Twitter® is a social microblogging service on which users post and interact with messages known as "tweets." Registered users can post, like, and retweet tweets, but unregistered users can only read them. A user can "follow" another user so that the user receives notifications of posts posted by the followed user. As such, a user with more followers has greater influence over users.

LinkedIn® is an employment-oriented online platform that is mainly used for professional networking, including employers posting jobs and job seekers posting their resumes. LinkedIn® allows members to create profiles and "connections" to each other. Certain users can be designated as "influencers."

Instagram® is a media sharing platform. An associated app allows users to upload media (e.g., photographs) that can be edited with filters and organized by hashtags and geographical tagging. Posts can be shared publicly or with pre-approved followers. Users can like photos and follow other users to add their content to a feed.

Other social media platforms similarly enable sharing different forms of content and provide a way to rank users based on a status such as being deemed an influencer or based on connectedness to other users. For example, TikTok® is a video-sharing social networking platform that is used to create short music, lip-sync, dance, comedy and talent videos of 3 to 15 seconds, and short looping videos of 3 to 60 seconds. Snapchat® is a multimedia messaging platform that allows users to share content that is only available for a short time before it become inaccessible by recipients. Pinterest® is an image sharing and social media platform designed to enable saving and discovery of information (specifically "ideas") on the Internet by using images, GIFs, and videos, in the form of pinboards. Reddit® is a social news aggregation, web content rating, and discussion website. Registered members submit content to the site such as links, text posts, and images, which are then voted up or down by other members. Submissions with more up-votes appear towards the top and, if they receive enough up-votes, ultimately on the site's front page. Other types of social media platforms include discussion forums and anonymous social platforms to communicate anonymously among users.

In one example, the social media data includes the status of a user such as a social media ranking that is determined by the social media platforms. The status can indicate a magnitude of connectedness of a user with other users of a social media platform or a magnitude of influence over other users of the social media platform. Hence, the social media data can indicate the popularity of users on certain social media platforms and their connections with other users. The users with more connections to other users can be ranked higher than registered users with fewer connections. In some instances, a social media platform can rank users based on threshold numbers of connections or whether or not they are designated as having a particular impact or influence on other users. For example, a user with 500,000 connections could be ranked as "popular" compared to an "unpopular" user with 500 or fewer connections.

At 404, the system analyzes information of users of the wireless network. The information includes profile data retrieved at a UDM database, which could include the social media data of the social media platforms. Thus, the profile data of users of the wireless network can map to or include social media data that associates those users with social media platforms and indicates their importance or connectedness relative to the social media platforms. In one example, the UDM database stores social media rankings for each user of the wireless network, where the social media rankings were determined by the social media platforms. In another example, the wireless network can obtain the social media data from a social media database of the wireless network, which can data from the social media platforms to rank the users based on the collected data. For example, the social media platforms may only provide the number of connections that users have with other users of the same platform. The system can then determine the relative significance of users based on their respective connections on the same social media platform or across multiple social media platforms.

At 406, the system ranks the users according to a network security ranking to identify target users as potential hotspots for cyberattacks. For example, the system can rank users based on existing social media rankings. In particular, a social media account of a target user with a status that exceeds a threshold number of users could be deemed a potential hotspot for a cyberattack. The status and the threshold can be determined based on a type of a social media platform associated with the social media account. The status can relate to a number of existing connections with other users of the social media platform, and the threshold could be a quantity of connections. In particular, the status can be based on a quantity of Facebook® friends, Twitter® followers, or Linkedin® connections for particular users. For example, users with more than 50,000 followers on a social media platform or users designated as influencers could be designated as hotspots.

The system can rank users based on the connections between the user's social media account and other social media accounts of the same or different social media platforms. A user with a greater number of connections can be ranked higher than another user with a lower quantity of connections. For example, a user with more Facebook® friends can be ranked higher than another user with fewer Facebook® friends, Twitter® followers, and/or Linkedin® connections. In another example, the social media data may include an explicit ranking as determined by a social media platform relative to other users. Thus, a network security ranking can correspond to an existing social media ranking determined by the social media platform.

At 408, the system dynamically assigns computing resources based on the network security ranking to monitor one or more computing devices associated with the target users identified as potential hotspots for cyberattacks. For example, the system can assign computing resources only to computing devices associated with users that have an influencer status or have greater than 1 million connections or followers. Alternatively, the system can allocate computing resources in proportion to their rank. For example, the system can allocate additional computing resources to a computing device associated with a user having a higher network security rank compared to another user having a lower network security rank. The computing resources can include a computing device or software application that monitors the computing devices for malicious activity or policy violations associated with the users. Any malicious activity or violation can be reported either to an administrator or collected centrally using a SIEM system.

At 410, the system can optionally determine whether other connected users are at risk of cyberattacks based at least in part on their association with identified hotspots. In other words, the system can evaluate an entire social network based on its interconnectedness to hotspots. For example, once a primary user has been identified as a hotspot, the secondary users connected to the primary user can be identified as associated with the hotspot, though perhaps with less risk of harm. Likewise, tertiary users connected to the secondary users can be identified as being associated with the hotspot, though perhaps with even less risk of harm compared to the secondary users, and so on. The system can rank the other users connected to target users associated with hotspots according to a network security ranking and can dynamically allocate or re-allocate the computing resources based on the network security ranking to monitor the existing connections and users at risk of cyberattacks. In this manner, the system can prevent or reduce the harm of cyberattacks to wireless networks or social media platforms.

At 412, the system can optionally inject network traffic for a social media account associated with a hotspot to draw out a cyberattack. For example, the system can send numerous connect requests for the social media account to induce malicious activity that is detectable by the computing resources. In general, the system can mimic a process for social media traffic to induce malicious activity on a social network platform. The type and duration of the process can be set based on statistical data about a social media platform or other features that are correlated with malicious activity. For example, a type of social media traffic could be injected for an average time period that is historically required for malware on a social media platform to generate detectable malicious activity.

At 414, the computing resources are caused to monitor the computing devices. For example, the computing resources can monitor and control the computing devices relative to a social media platform in accordance with a security model. The security model is a framework for security based on one or more security parameters. For example, the computing resources can monitor whether a computing device is generating malicious communications or sharing content in a manner that violates network policies. Any malicious activity or violation can be reported either to an administrator or collected centrally using a SIEM system. In one example, the security model includes a learning component that is trained based on data collected of multiple social media platforms.

At 416, the system receives an indication of a malicious software, policy violation, or another indication of a potential cyberattack from the computing devices associated with the target users identified as the potential hotspots for cyberattacks. More specifically, the computing resources detect the threat of a potential or actual cyberattack. For example, malicious software of the computing devices can be detected by the computing resources in response to injected network traffic for a social media account, which drew out the malicious software. In one example, the network traffic includes social media traffic with periodic connection request for a social media account. Acceptances that are generated with the same periodicity in response to the connection requests indicate machine generated traffic, which is likely generated by malicious software.

At 418, the system can cause the wireless network or social media platform to perform an action that prevents or reduces the harm from a detected potential or actual cyberattack. That is, the system can perform one or more actions to mitigate the harm of a cyberattack. The action(s) can include blocking or diverting network traffic on the 5G network associated with a social media account. In another example, the system can divert the social media traffic (e.g., content) to a containment area instead of an intended destination. The containment area can be separate from the 5G network, to inspect the social media traffic and remove malicious traffic without harming the 5G network. The social media traffic can be temporarily stored and later dispatched upon determining that the social media traffic is unrelated to actual malicious activity.

Computer System

Figure 5:
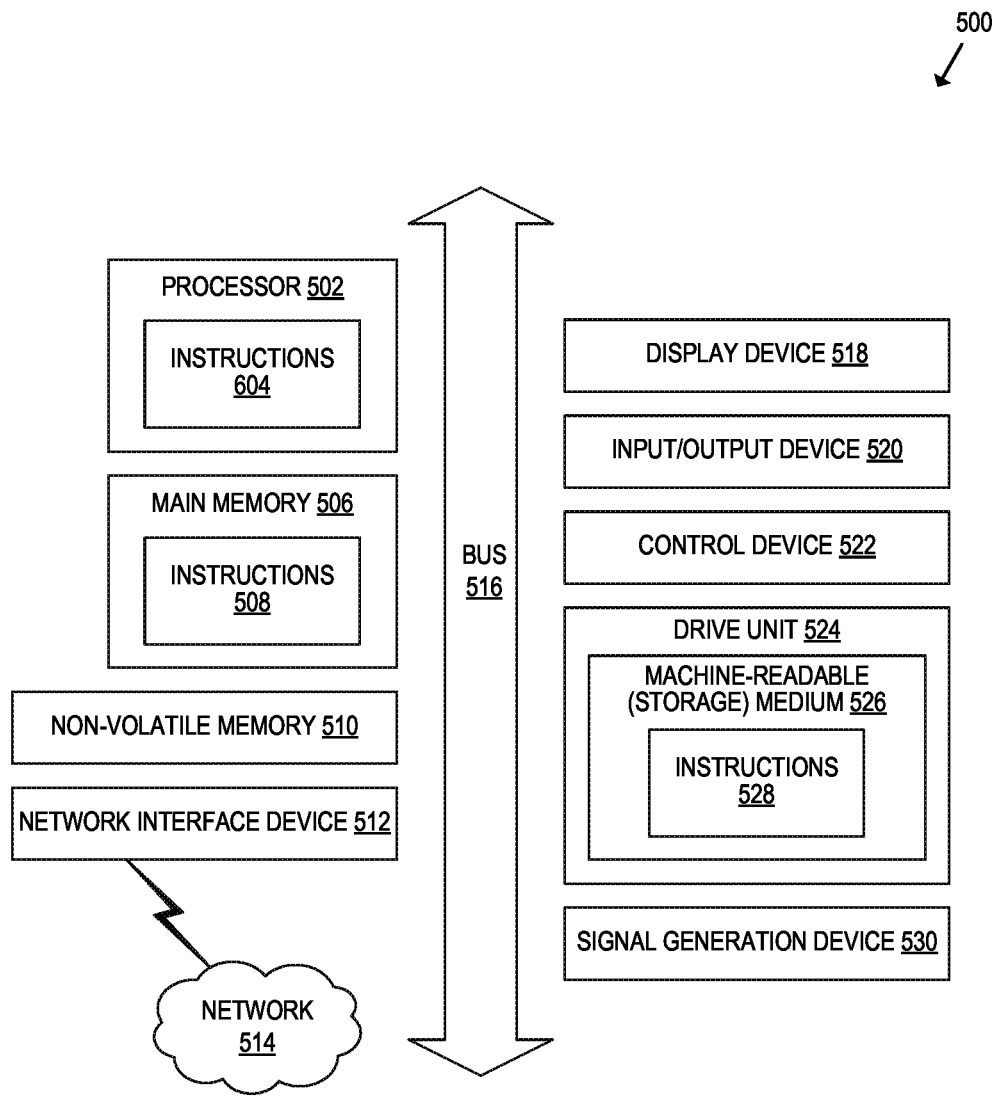
FIG. 5 is a block diagram that illustrates an example of a computing system in which at least some operations described herein can be implemented.

FIG. 5 is a block diagram that illustrates an example of a computer system 500 in which at least some operations described herein can be implemented. For example, components discussed in FIGS. 1 through 3 can include or host components of the computing system 500.

As shown, the computer system 500 can include one or more processors 502, main memory 506, non-volatile memory 510, a network interface device 512, video display device 518, an input/output device 520, a control device 522 (e.g., keyboard and point device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. The bus 516 therefore can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire"). Various common components (e.g., cache memory) are omitted from FIG. 5 for brevity. Instead, the computer system 500 is intended to illustrate a hardware device on which components illustrated or described relative to the examples of FIGS. 1-5 and any other components described in this specification can be implemented.

The computer system 500 can take any suitable physical form. For example, the computing system 500 may share a similar architecture as that of a personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some embodiment, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The processor 502 can be, for example, a central processing unit, a conventional microprocessor (e.g., Intel Pentium processor). The memory (e.g., main memory 506, non-volatile memory 510, machine-readable medium 526) can be local, remote, or distributed. Although shown as single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. One skill in the relevant art will recognize that the machine-readable medium 526 can include any type of medium that is accessible by the processor. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 504, 508, 528), which set at various times in various memory and storage devices in computing device(s). When read and executed by the processor 502, the instruction(s) cause the computing system 500 to perform operations to execute elements involving the various aspects of the disclosure.

Although embodiments have been described in the context of fully functioning computing devices, the various embodiments are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

Software is typically stored in the non-volatile memory and/or the drive unit 524. When software is moved to the memory for execution, the processor 502 will typically make use of hardware registers to store values associated with the software and local cache that ideally serves to speed up execution. As used herein, a software program is assumed to be stored at any known or convenient location (e.g., non-volatile storage, hardware registers) when the software program is referred to as "implemented in a computer-readable medium." A processor can be "configured to execute a program" when at least one value associated with the program is stored in a register readable by the processor.

The network interface device 512 enables the computing system 500 to mediate data in a network 514 with an entity that is external to the computing system 500 through any communication protocol supported by the computing system 500 and the external entity. Examples of the network interface device 512 includes a network adaptor card, a wireless network interface card, a router, an access point, a wireless router, a switch, a multilayer switch, a protocol converter, a gateway, a bridge, bridge router, a hub, a digital media receiver, and/or a repeater.

Further, the interface device 512 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, an application, and the circumstances under which the permission rights stand.

Examples of the I/O devices 520 include a keyboard, a mouse or other pointing device, disk drives, printers, a scanner, and other input and/or output devices, including a display device. Examples of the display device 518 can include a cathode ray tube (CRT), liquid crystal display (LCD), or any display device.

In operation, the computer system 500 can be controlled by operating system software that includes a file management system, such as a disk operating system. One example of operating system software with associated item management system software is the family of operating systems known as Windows® from Microsoft Corporation of Redmond, Wash., and their associated item management systems. Another example of operating system software with its associated item management system software is the Linux™ operating system and its associated item management system. The item management system is typically stored in the non-volatile memory and/or drive unit and causes the processor to execute the various acts required by the operating system to input and output data and to store data in the memory, including storing items on the non-volatile memory and/or drive unit.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In some circumstances, operation of a memory device, such as a change in state from a binary one to a binary zero or vice-versa, for example, can comprise a transformation, such as a physical transformation. With particular types of memory devices, a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

While specific examples of technology are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples such that alternative implementations can employ differing values or ranges.

Details of the disclosed embodiments may vary considerably in specific implementations while still being encompassed by the disclosed teachings. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain embodiments are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will begin with the words "means for." However, the use of the term "for" in any other context is not intended to invoke a similar interpretation. The applicant reserves the right to pursue such additional claim forms in either this application or in a continuing application.

I claim:

1. At least one non-transitory computer-readable storage medium storing instructions to be executed by at least one processor, wherein execution of the instructions cause a system to:
   obtain user profile data of subscribers to a wireless network from a database of a core node;
   obtain social media data of the subscribers from a social media database,
      wherein the social media data indicates that the subscribers are members of social media platforms;
   identify an indication of a quantity of existing connections between each subscriber and other members of the social media platforms;
   rank each subscriber based on the subscriber's quantity of existing connections such that a subscriber with more connections is ranked higher than another subscriber with fewer connections;
   allocate computing resources to monitor one or more computing devices associated with subscribers that exceed a threshold rank;
   mimic a cyberattack by injecting social media traffic for social media accounts associated with the subscribers that exceed the threshold rank,
      wherein the mimicked cyberattack induces a cyberattack associated with a social media account; and
   receive an indication of a potential cyberattack identified by the one or more computing devices associated with at least one of the subscribers that exceeds the threshold rank.

2. The computer-readable storage medium of claim 1, wherein the quantity of existing connections includes at least one of: a number of followers, a number of friends, or number of associations with other social media accounts of a social media platform.

3. The computer-readable storage medium of claim 1, wherein the social media data indicates a subscriber's ranking as determined by a social media platform, and wherein the subscriber's ranking corresponds to a ranking determined by the social media platform.

4. The computer-readable storage medium of claim 1, wherein the database of the core node is a unified data management (UDM) node.

5. The computer-readable storage medium of claim 1, wherein the network is a 5G network and wherein the instructions further comprise proving a signal to the 5G network to dynamically assign logical firewalls or encryption modules based on the ranking to monitor or protect computing devices associated with subscribers that exceed the threshold rank and are thus identified as potentials for cyberattacks.

6. The computer-readable storage medium of claim 1, wherein the system dynamically assigns computing security resources based on identified malicious software or activities in computing devices for the subscribers that exceed the threshold rank.

7. The computer-readable storage medium of claim 1, wherein the instructions further comprise proving a signal to the network to allocate a computing device or software application to monitor for malicious activity or policy violations associated with mobile devices for the subscribers that exceed the threshold rank.

8. The computer-readable storage medium of claim 1, wherein the instructions further comprise reporting malicious activity or security violations to be collected centrally using a security information and event management (SIEM) system.

9. A method, comprising:
   obtaining user profile data of subscribers to a wireless network from a database of a core node;
   obtaining social media data of the subscribers from a social media database,
      wherein the social media data indicates that the subscribers are members of social media platforms;

identifying an indication of a quantity of existing connections between each subscriber and other members of the social media platforms;
ranking each subscriber based on the subscriber's quantity of existing connections such that a subscriber with more connections is ranked higher than another subscriber with fewer connections;
allocating computing resources to monitor one or more computing devices associated with subscribers as compared to a threshold rank;
mimicking a cyberattack by injecting social media traffic for social media accounts associated with the subscribers relative to the threshold rank,
wherein the mimicked cyberattack provokes a cyber-attack associated with a social media account; and
receiving an indication of a potential cyberattack identified by the one or more computing devices associated with at least one of the subscribers that exceeds the threshold rank.

10. The method of claim 9, wherein the quantity of existing connections includes at least one of: a number of followers, a number of friends, or number of associations with other social media accounts of a social media platform.

11. The method of claim 9, wherein the social media data indicates a subscriber's ranking as determined by a social media platform, and wherein the subscriber's ranking corresponds to a ranking determined by the social media platform.

12. The method of claim 9, wherein the database of the core node is a unified data management (UDM) node.

13. The method of claim 9, wherein the network is a 5G network, and further comprising indicating to the 5G network to dynamically allocate virtual firewalls or encryption modules based on the ranking to protect against cyberattacks.

14. The method of claim 9, further comprising reporting malicious activity or security violations to be collected centrally using a security information and event management (SIEM) system.

15. A system comprising:
a processor; and
a memory coupled to the processor, wherein the memory stores instructions which, when executed by the processor, cause the system to:
rank users of a wireless network based on social media data stored at a unified data management (UDM) database;
identify a target user with a rank as compared to a threshold rank as a potential hotspot for cyberattacks,
wherein the threshold rank corresponds to a status indicated by the social media data;
dynamically assign computing resources to monitor one or more computing devices associated with the target user identified as the potential hotspot for the cyberattacks;
mimic a cyberattack by injecting social media traffic for social media accounts associated with the users that exceed the threshold rank; and
receive an indication of malicious activity of the one or more computing devices associated with the target user identified as the potential hotspot for the cyberattacks,
wherein the malicious activity is detected by the computing resources.

16. The system of claim 15, wherein the instructions further comprise:
inject social media traffic for a social media account associated with the hotspot to draw out the cyberattacks,
wherein the malicious activity is identified by the one or more computing devices in response to the injected social media traffic.

17. The system of claim 15, wherein the status indicates a magnitude of connectedness of a user with other users of a social media platform.

18. The system of claim 15, wherein the status indicates a magnitude of influence of a user over other users of a social media platform.

19. At least one non-transitory computer-readable storage medium storing instructions to be executed by at least one processor to identify users who pose a higher risk to a 5G network, wherein execution of the instructions cause a system to:
obtain user profile information stored in a Unified Data Management database of the 5G network;
analyze the user profiles of users having social media accounts;
ranks the users having the social media accounts according to a social network member network security ranking to identify the users who are hotspots for cyber-attacks,
wherein the hotspots for cyber-attacks are users of a social media account who have a status exceeding a threshold, and
wherein the status and the threshold are determined by a type of social media account;
dynamically assign computing resources based on the ranking to monitor computing devices associated with the users identified as the hotspots for the cyber-attacks;
mimic a cyberattack by injecting social media traffic for social media accounts associated with the users that exceed the threshold rank; and
identify malicious software in the computing devices using the dynamically assigned computing resources.

20. The computer-readable storage medium of claim 19, wherein the instructions further comprise:
identify certain connections associated with the hotspots,
rank the connections according to a social network member network security ranking, and
assign the computing resources to the connections based on the ranking.

* * * * *